8627X
A. C. Hanford,
Washing Machine
Patented Feb. 6, 1835.
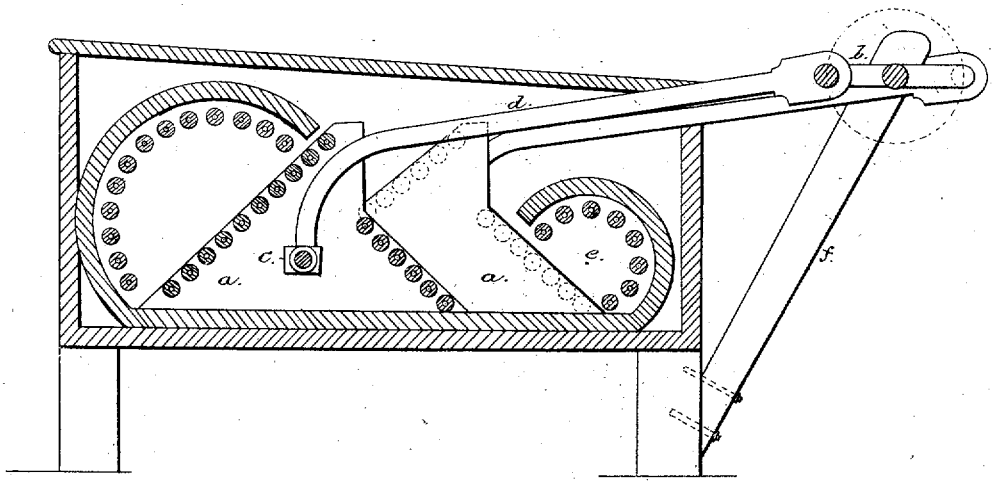
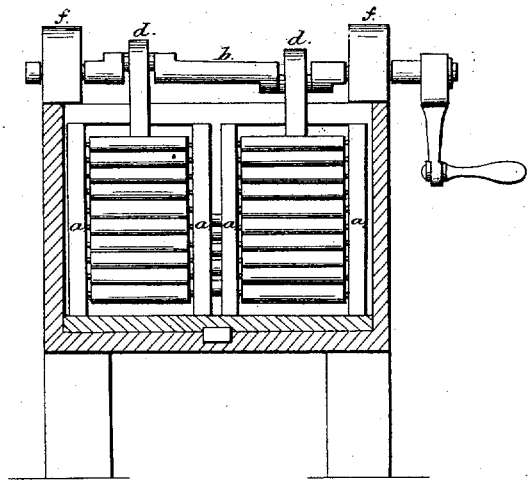
N. PETERS, PHOTO-LITHOGRAPHER, WASHINGTON, D. C 86274 Feb. 6. 1835 229.

Amos C. Haniford of Northfield, county of Merrimack State of New Hampshire

Letters Patent

The Schedule referred to in these Letters Patent and making part of the same, containing a description in the words of the said Amos C. Haniford himself of his Improvement in a Machine for washing Clothes To all to whom these Presents shall come Be it known, that I, Amos C. Haniford, of Northfield in the county of Merrimack and State of New Hampshire, have invented a new and useful improvement in washing clothes, and that the following is a full and exact description of the construction and operation of the said Machine, as invented or improved by me —

The frame of the Machine may be varied in its form, but that represented in the drawing thereof, deposited in the Patent Office, I have found to be a convenient one. The washing is effected between the two feet or moveable parts and a half circle at each end of the box. The length and breadth of the feet as well as the size of the other parts of the Machine are to be varied according to the power to be applied to it. In a small Machine the sides of the feet may be made of boards one inch thick, and eighteen inches long on the bottom and running an angle of forty five degrees on the first end from the crank eight inches, then perpendicular five inches, then horizontal one and one half inch, then from the top to bottom fourteen and one half inches making an angle of forty five degrees on the opposite side from the crank. The feet are made seven inches three quarters wide from outside to outside, and filled with rounds on each angle part made fast one quarter of an inch apart and one inch in diameter. Motion is given to those feet by a crank with two projections of four inches each, from each projection to a cross piece in the centre of the feet from each end, and two inches from the bottom by a shaft, two feet Drawing Made eleven inches, being straight on the crank ends and crooked on the feet ends so as to work in the open space that is above the short angle and to work on the centre of the cross piece and crank –

The half circle neat to the crank is seven inches in diameter, & sixteen inches long, the length being horizontal and filled with moveable rounds one inch in diameter and three eights apart, the other half circle is twelve inches in diameter and sixteen inches long, filled with moveable rounds one inch in diameter and three eights of an inch apart –

The feet move on a false bottom extending from one half circle ~~to circle~~ to the other, and is one inch thick with the channel cut in the under part, for the water to pass from the crank ~~end~~ end to the opposite end, and to be discharged from the box – The box stands on four uprights or legs being placed near each corner of the box – The crank is supported by two props made fast ~~near each corner of the box – The crank is supported by two props made fast~~ near the bottom of the two uprights, at the crank end, standing in a sloping position, so as to place the crank horizontal from the top of the box eleven inches, and perpendicular four inches. The box inside is two feet ten inches long, sixteen inches wide, twelve inches deep at the crank end, and fourteen at the opposite end and has a cover that secures the water when washing – the cover has two open spaces for each shaft to work in – –

I do not claim as my invention any of the parts of this machine taken separately, nor do I claim the performing of the operation of washing simultaneously, this having been before effected – But what I do claim is the general construction & arrangement of the washing part, consisting of the two feet & the two half circles constructed in the manner and operating upon the principle herein before set forth, without regard however to any particular dimentions or materials or to the precise form given to the respective parts –

Witnesses
G. W. Bean
Hezekiah Bean

Amos. C. Haniford

754